United States Patent

[11] 3,621,126

[72] Inventors Heinz Taudt
Kiel;
Hans Keller, Molfsee, both of Germany
[21] Appl. No. 713,490
[22] Filed Mar. 15, 1968
[45] Patented Nov. 16, 1971
[73] Assignee Rudolf Hell Kommanditgesellschaft
Kiel-Dietrichsdorf, Germany
[32] Priority Mar. 17, 1967
[33] Germany
[31] H 62 168

[54] METHOD FOR ELECTRONICALLY COPYING PARTS OF DIFFERENT PICTURE ORIGINALS
6 Claims, 4 Drawing Figs.

[52] U.S. Cl. .......... 178/6, 178/DIG. 6, 178/5.2, 178/6.7, 250/220
[51] Int. Cl. .......... H04n 1/38, H04n 5/22
[50] Field of Search .......... 355/38; 178/6, 6.7, 6.7 A, DIG. 6; 250/219 I, 220, 226

[56] References Cited

UNITED STATES PATENTS

| | | | |
|---|---|---|---|
| 2,961,920 | 11/1960 | Sachtleben | 178/6.7 |
| 2,985,063 | 5/1961 | Putzrath | 178/6 FM |
| 2,985,064 | 5/1961 | Dimmick | 355/38 |
| 3,037,422 | 6/1962 | Haynes | 250/220 |

FOREIGN PATENTS

| | | | |
|---|---|---|---|
| 1,172,540 | 6/1964 | Germany | 178/6 FM |
| 743,402 | 1/1956 | Great Britain | 178/6 FM |

*Primary Examiner*—Robert L. Griffin
*Assistant Examiner*—Joseph A. Orsino, Jr.
*Attorney*—Hill, Sherman, Meroni, Gross & Simpson

ABSTRACT: This invention is directed to method of electronically copying parts of different picture originals. The originals are photoelectrically scanned by a light beam while simultaneously scanning a mask. The scanning of the originals and the mask occur synchronously and in register with one another. Picture signals and mask signals are developed during the scanning operation, and the mask signals are split into a plurality of transducers which are sensitive to different spectral regions of each mask color to produce characteristic mask signals. The picture signals are then connected to recording devices for reproduction in accordance with the mask signals produced.

INVENTORS
Heinz Taudt
Hans Keller

BY Hill, Sherman, Meroni, Gross & Simpson ATTYS.

| | I (white) | II (red) | III (green) | IV (black) |
|---|---|---|---|---|
| Switch Signal Red | 1 | 1 | 0 | 0 |
| Switch Signal Green | 1 | 0 | 1 | 0 |
Fig. 2
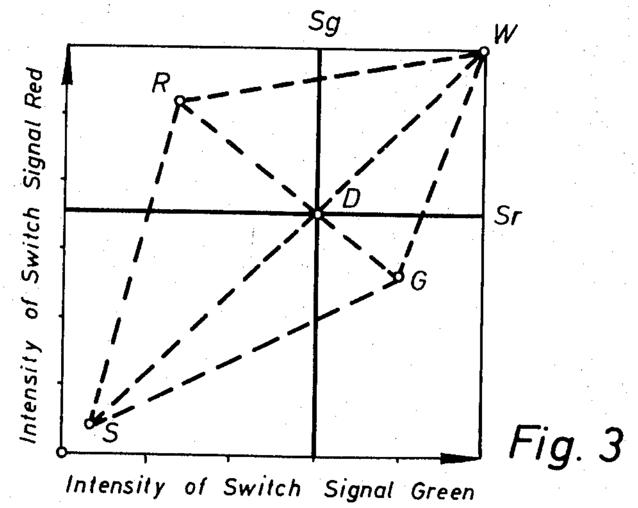
Fig. 3
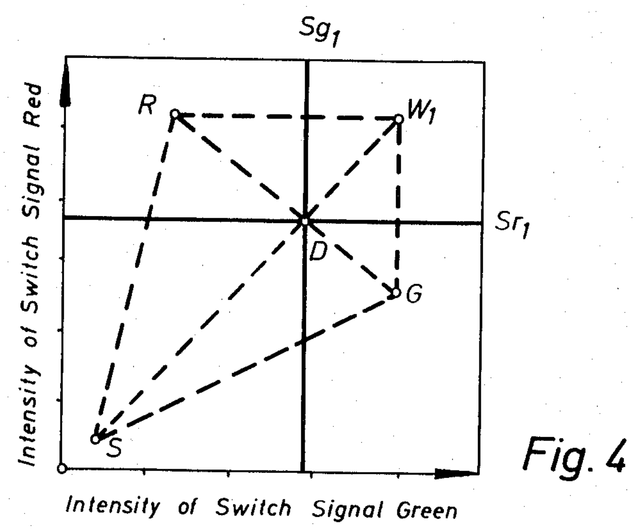
Fig. 4
INVENTORS
Heinz Taudt
Hans Keller
BY Hill, Sherman, Meroni, Gross & Simpson ATTYS.

METHOD FOR ELECTRONICALLY COPYING PARTS OF DIFFERENT PICTURE ORIGINALS

BACKGROUND OF THE INVENTION

The present invention relates to a method for electronically copying different parts of original pictures during the photoelectrical scanning of said originals, using a mask which is scanned synchronously and in register with the originals, whose differently colored partial surfaces, which correspond to the parts of the individual originals to be copied, cause during scanning each time on a change of color, the appropriate picture signals to be connected to the recording device for the reproduction.

German Pat., Spec. No. 1,172,540 discloses a method for electronically copying parts of different picture originals during photoelectric scanning thereof and tone or color correction subsequent thereto of the tone or color information signals obtained during scanning as well as the use of the corrected tone or color information signals for producing recordings of the composition of the copied picture portions, and this method is characterized in that a mask is used which contains, structurelessly and homogeneously, and each time in another color or in another tone, the surface areas of the individual picture parts to be retained and adjoining one another without gaps, of the picture originals which are partly to be reproduced. Moreover the mask is photoelectrically scanned synchronously and in register with the picture originals (or their uncorrected photographic color separations), and the signals of different discrete amplitudes obtained by scanning the mask being effective when their amplitude is changed, only the tone or color information signals obtained from one of the various picture originals being released for the tone or color correction as well as the subsequent recording.

If picture segments of more than two picture originals are to be copied in one reproduction, the mask contains on the surface areas, corresponding to the different picture segments, not only the colors black and white but also other degrees of coloring which may be different gray tones or color tones. During the photoelectric scanning of these different mask colors, discrete mask signals are received which, arranged according to ascending or descending signal magnitude, produce a one-dimensional sequence of values. The method mentioned has a disadvantage which arises when three or more than three different picture segments are to be copied.

If the light ray scanning the mask passes from short surface of smaller brightness to a surface of greater brightness or vice versa, but if these two brightnesses do not directly follow one another in the sequence arranged according to ascending or descending brightnesses, but are separated from one another by intermediate brightnesses which are allocated to other areas of the mask, it cannot be avoided, due to the final diameter of the scanning light ray, that when the boundary line is exceeded, perhaps between black and white, the mask signal continuously varies between its smallest and greatest value, and that consequently the mask signal also assumes for a short time those values which correspond to the intermediate brightnesses in the brightness sequence and thus effects the connection of picture signals, which are allocated to picture segments which are not to be copied in the reproduction of the transition point.

Disturbing fringes occur in this way in the reproduction on both sides along the boundary lines of the picture segments allocated to the black-white boundary line of the mask and also along the certain other boundary lines of the mask.

SUMMARY OF THE INVENTION

It is an object of the present invention to prevent these disturbing fringes from occurring or substantially to reduce them.

The invention consists in that the scanning light reflected or passed through by the mask is conveyed by beam splitting into two or three photoelectric transducer (photocells or secondary electron multipliers), which are sensitive in different ways for different spectral regions and for each mask color produce a characteristic pair or trio of mask signals which effect the connection of the picture signals allocated to the mask colors, to the recording device for reproduction.

According to one embodiment of the invention, the different mask signals produced by each of the two or three photocells when the mask is scanned, are compared each time with a signal value chosen for the photocell concerned, one or the other of two binary signals (0,1) is produced when this value is not attained or is exceeded, so that another of the four 2- or eight 3-combination of both binary signals 0 and 1 is allocated to each of the four or eight mask colors, and these different signal combinations trigger a switching arrangement which effects the connection to the recording device of that picture signal allocated to the occurring signal combination.

By using two or three photocells, the one-dimensional value sequence of the mask signals is replaced by a two- or three-dimensional value sequence. With a suitable choice of the spectral sensitivities of the photocells and the selected comparison signal values, it is then possible, when passing from one mask to another, to pass from one pair or trio of switch signals to another, without the pairs or trios of switch signals, which are allocated to mask colors whose brightnesses lie between the brightnesses of the transition colors, being triggered when the color boundary line of the mask is exceeded. To this end, it is necessary that the individual mask areas be colored, and that the photocells respond differently to different colors, this being attainable for example by differently colored color filters interposed in the path of rays.

BRIEF DESCRIPTION OF THE DRAWINGS

In order that the invention may be more readily understood, one embodiment thereof will now be explained with reference to the accompanying drawings by way of example and in which:

FIG. 2 shows a table of the switching states.

FIGS. 3 and 4 show the amplitude relations in the different switch states.

DESCRIPTION OF THE PREFERRED EMBODIMENT

Figure 1:
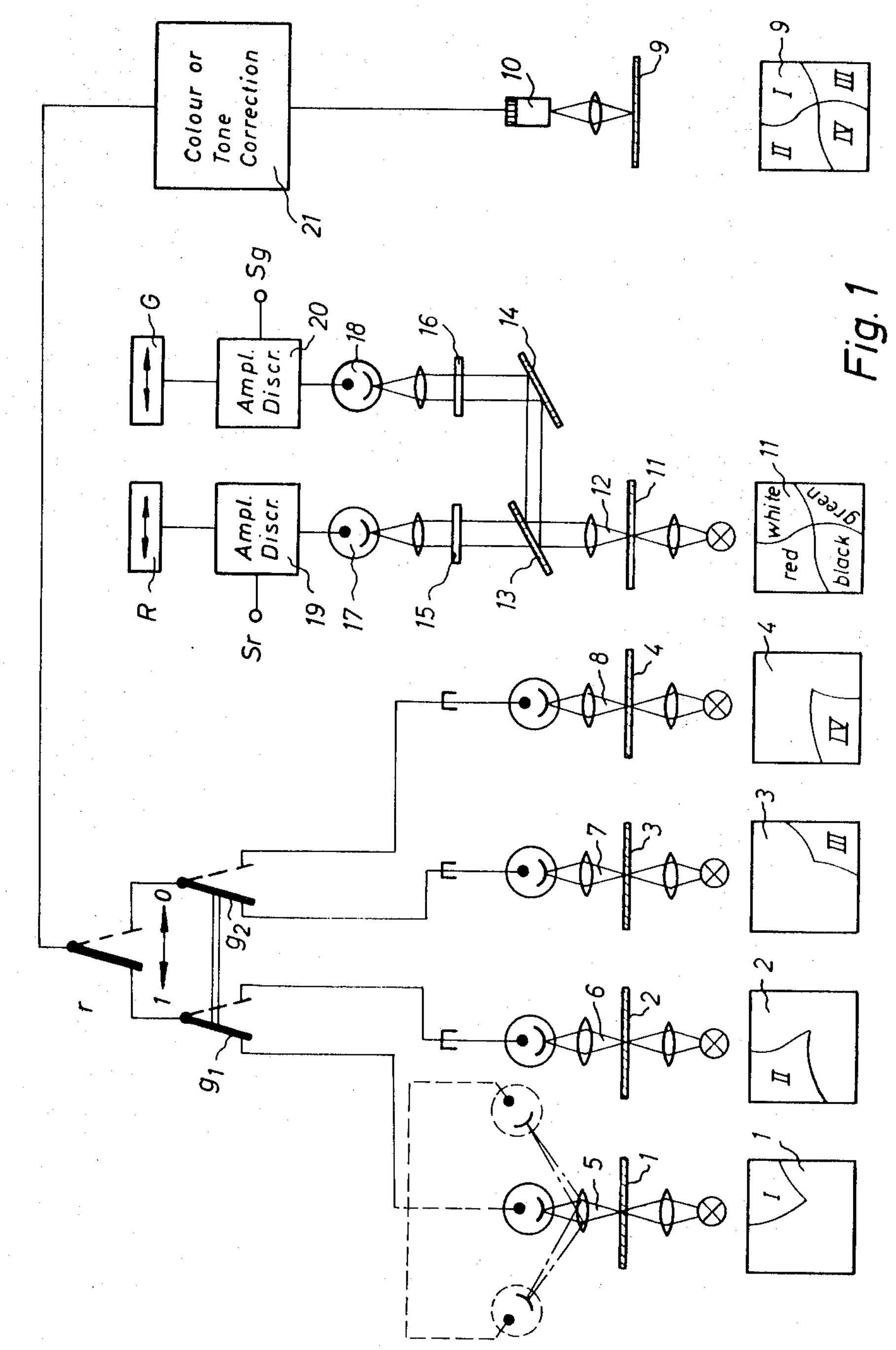
FIG. 1 shows a basic optical-electrical switching arrangement for carrying out the method according to the invention, the method being limited to two dimensions, and thus to two photocells.

Referring now to the drawings. FIG. 1 shows the picture originals 1, 2, 3, 4 which are shown in plan view on the one hand and in section on the other hand, and which are scanned point-by-point along successive lines synchronously and in register by four photoelectric scanning devices 5, 6, 7, 8. The scanning devices consist in known manner of a light source *5a*, two focusing optics *5b*, and *5c* a photocell *5d*. If the picture originals are colored, electronic color separations are produced for reproducing these picture originals. The scanning light beam reflected or passed by a picture original is then divided into three paths, in each of which is located another color separation filter. The filtered light rays fall on three photocells or multipliers and produce therein a trio of color separation signals. In order not to render the drawing too indistinct, the divisions of the scanning light into three paths of rays in the individual picture originals have been left out and the three photocells replaced by one. From the picture originals 1, 2, 3, 4 the picture segments I, II, III and IV are to be copied in the reproduction 9. To this end, it is necessary that these individual picture segments are joined together to form a picture of equal size without gaps. In order to be able to connect the four picture signals which occur permanently and simultaneously at the outputs of the photoelectic scanning devices 5, 6, 7, 8 during the scanning process, each time to the recording device 10, if and only if, the picture segments I, II, III, IV to be copied are encountered during scanning, the mask 11 is scanning synchronously and in register with the picture originals by a further photoelectric scanning device 12. The areas corresponding to the picture segments I, II, III, IV are colored differently in this mask, structurelessly and homogenously, viz. I: white, II: red, III: green, and IV: black. The beam from the scanning device 12 is divided into two paths by a semipermeable mirror 13 and a deflector mirror 14, into which paths color filters 15 and 16 are switched, filter 15 being a red filter and filter 16 being a green filter. The mask colors may also be different, e.g., yellow and blue; accordingly, the filter colors are then also yellow and blue. The filtered light rays fall on photocells or multipliers 17 and 18 which have been rendered sensitive to red and green by the filters 15 and 16. In this way, different characteristic pairs of signal values are produced for each mask color scanned. The amplitudes or intensities of the signals triggered in both photocells 17 and 18 are compared in two amplitude discriminators 19 and 20 having fixed selectable value Sr and Sg respectively. If these threshold values are not attained or are exceeded, a binary switch signal 0 or 1 is produced in each discriminator. These switch signals actuate relays R and G with contacts $r$, $g_1$ and $g_2$ which are connected together in the so called "Fir-tree switching" and the contacts $g_1$ and $g_2$ of which are mechanically coupled. The left-hand position of the contacts is designated by "1", the right-hand by "0". The thick solid line designates the left-hand position of the contacts which corresponds to the pair of switch signals 1,1. In this position of the contacts, only the picture signal produced by the scanning of the part of the picture I of the picture original 1 is connected to the recording device 10 via a color or tone correcting device 21. The scanning mask color is thereby white. The remaining picture signals which are produced during the scanning of the picture segments II, III, IV of the picture originals 2, 3, 4 to be copied, to which the remaining mask colors red, green and black are allocated, are characterized by the other three possible combinations 1, 0; 0, 1; of the pairs of switch signals and consequently the contact positions. In each of the four possible combinations of the positions of the contacts $r$, $9_1$, $g_2$, the allocated picture signal and only this signal, is connected to the recording device 10. The table of FIG. 2 shows the four possible switching states. In FIG. 1, the switches have been shown as relays on the grounds of clarity and easier comprehension. In actual fact, due to the rapidity of the switching processes, electronic switches are used. The recording device 10 is an engraving tool if color separation printing plates are to be directly electromechanically produced; it is a recording glow lamp, if corrected photographic picture separations are to be prepared.

The diagrams of FIGS. 3 and 4 serve for the easier comprehension of the amplitude relations in the switching processes.

In the diagram of FIG. 3, the signal intensity or amplitude of the red-sensitive photocell 17 is plotted vertically, and the green-sensitive photocell 18 plotted horizontally. The points S, R, G and W form an irregular polygon and are those points whose ordinates represent the signal voltages of the red-sensitive photocell 17 and whose abscissae represent the signal voltages of the green-sensitive photocell 18 when the mask colors black, red, green and white are scanned. Upon transition from one mask color to another, the pairs of signal values of both photocells move along the dashed lines. When the boundary lines of two adjacent, differently colored mask areas are exceeded, the values of both photocell voltages continuously change due to the final diameter of the scanning light ray. A line parallel to the abscissae and a line parallel to the ordinate is drawn through the point of intersection D of the diagonals. The former parallel line represents the fixed comparison threshold value Sr, the analogue voltage of the red-sensitive photocell 17 being converted by the amplitude discriminator 19 into two digital binary signals 0 or 1 when this value is not attained or is exceeded. The second parallel line represents the fixed comparison threshold value Sg, the analogue voltage of the green-sensitive photocell 18 being converted by the amplitude discriminator 20 into two digital binary signals 0 or 1 when said value is not attained or is exceeded.

If for example the mask color changes during scanning from white to red, only the switch signal green passes from 1 to 0 when the value $S_g$ is not reached, while the switch signal red retains its value 1. By reversing the contacts $g_1$ and $g_2$ from position 1 into position 0 (contact $r$ retains its position 1), the picture signal I is switched off and the picture signal II is connected to the recording device 10. Since, when the contacts $g_1$ and $g_2$ are reversed into position 0, the picture signals III and IV remain switched off, it is not possible that one of these picture signals is temporarily switched through when contacts $g_1$ and $g_2$ are reversed. The same applied to the transitions red - black, black - green, and green - white, and vice versa.

A faulty switching is only conceivable if during the transition from one color to another, when the mask is being scanned, both switch signals, red and green, turn around, i.e., a transition from black to white, or vice versa, or from red to green or vice versa, In the most unfavorable choice of threshold values Sr and Sg it is then possible that one switch signal is turned around first and the other shortly afterwards, so that in the meantime, a picture signal other than that belonging to white and black (I and IV) or that belonging to red and green (II and III) is switched through to the recording device 10. If, however, the threshold values Sr and Sg are chosen such that the continuously changing signal voltages of both photocells 17 and 18 reach the threshold values Sr and Sg at the same time, the temporary switching through of an undesired picture signal when a boundary line is exceeded is also avoided in these two cases. This is then the case when, as shown in FIG. 3, the lines parallel to the axes of the coordinates, which represents the threshold values Sr and Sg, pass through the point of intersection D of the diagonals SW and RG.

The pigment colors which are available for dyeing the mask are not all equally well suited. A color of this type should produce, behind a filter of the same color during the photoelectric scanning, if possible the same signal intensity as in the scanning of white, behind the complementary-colored filter the same signal intensity as in the scanning of black. While the latter is to be achieved approximately, a red color produces behind a red filter only about 80 percent and a blue-green color behind a blue-green filter only about 50 percent of that signal intensity which is obtained when scanning white. This results in the turn-around of both switch signals red and green in different manners when boundary lines between different mask colors lying obliquely to the scanning direction are being scanned, so that in one case the turn-around is already effected if the scanning light beam has exceeded the boundary line by 40 percent and in the other case, only when it has exceeded the boundary line by 60 percent. These insignificant shifts or displacements can, as the occasion arises, give rise to disturbances.

These disturbances are avoided according to a further embodiment of the invention by reducing the color white in brightness by mixing in gray and that of the two adjacent colors red or green, which produces the greater signal intensity behind the filter of the particular color (red as a rule), in such a manner that the altered white produces behind both filters the same signal intensities as the mask colors whose colors are the same as the filters. The weakened white must therefore produce behind the red filter the same signal intensity as the color red and behind the green filter the same signal intensity as the color green. The white must therefore alter its position in the diagram of FIG. 3 from W to $W_1$. This new position of the (weakened) white is shown in the diagram of FIG. 4. If then the mask colors red and green produce behind the complementary-colored filters (green and red) signal intensities which are almost the same as the signal intensities which are produced when black is scanned, which as a rule is sufficiently the case, the turn-around of the switch signals red and green into the other of the two possible binary states always proceeds when the scanning light ray is moved by a half over a color boundary line on the mask.

The method described can be enlarged to three dimensions with the aid of three photocells in front of which a red, a green and a blue color filter is placed. Then, up to eight different mask colors (black, white and six colors which correspond in tone somewhat to the colors magenta, red, yellow, green, cyan and violet) can therefore be used for copying up to eight different picture segments. This, however, produces a few difficulties due to the very small differences of the signal intensities which are produced when mask colors immediately following one another in brightness are scanned.

The application of the method is not limited to the copying of different picture segments. Instead of a picture original, a fixed signal value coming from a signal generator can also be connected to the recording device, for example in order to record at one spot in the reproduction a homogeneous one-colored tone surface, for example writing, or in order to produce a neutral background against which representations of persons are to stand out. It is however also possible to alter areas in the reproduction of a picture original determined by the switch signals, the contrast or color correction being altered locally. Then the picture signals produced by scanning the picture segments of a plurality of picture originals are not connected by the switch signals to the recording device, but, instead of this, different tone or color correction programs are switched in for the individual picture segments of our picture original.

We claim:

1. A method of electronically copying parts of different picture originals, comprising the steps of: producing a principle mask consisting of a plurality of partial masks, said partial masks having characteristic shapes corresponding to the contours of said parts of said different picture originals, each of said partial masks having a mask color which is representative of one of said parts of said picture originals; directing light from said picture originals and said masks and photoelectrically scanning synchronously and in registry said principle mask and said originals to detect said light; converting the light from said originals into electrical picture signals; splitting the light of said partial masks into a plurality of light beams; converting the light of said light beams into electrical signals by means of a plurality of transducers which are sensitive to different spectral regions to produce characteristic partial mask signals; and connecting said picture signals which are allocated to the partial masks to a recording device for reproduction in response to said partial mask signals.

2. A method according to claim 1 further including the steps of: comparing said partial mask signals each time with a fixed signal which is selected for the relevant transducer; and producing a binary signal when said partial mask signals are different from said fixed signal to connect said picture signals to said recording device in response to said binary signal.

3. A method according to claim 1 further including the steps of: reducing the brightness of one of said mask colors indicative of the color white by means of filtering portions of other colors so that the reduced mask color produces substantially the same signal intensity as those mask colors which are the same in color as the color filters employed.

4. An apparatus for electronically reproducing different parts of a plurality of picture originals, comprising: a plurality of photoelectric scanners for scanning each picture original; a first plurality of photocells associated with each photoelectric scanner to produce a corresponding plurality of electrical picture signals; a principle mask consisting of a plurality of partial masks having different colors, each color corresponding to a particular part of a particular picture original; a photoelectric scanner for scanning said principle mask to produce a mask signal beam; means to divide said mask signal beam; a second plurality of photocells to convert the light of said mask signal beam into characteristic mask signals; a reproducer and switch means connected to said first plurality of photocells and operated by said mask signals for selectively connecting the output of a particular photocell of said first plurality of photocells to said reproducer to reproduce the desired portion of a particular picture original.

5. An apparatus for electronically reproducing different parts of a plurality of picture originals according to claim 4, wherein said means to divide said mask signal beam includes a semipermeable mirror for deflecting a portion of said mask signal beam and for transmitting a portion of said mask signal beam; a deflector for receiving the deflected portion of said mask signal beam; first and second photocells for receiving the transmitted portion and the deflected portion of said mask signal beam respectively; first and second amplifier discriminators connected to said first and second photocells for operating said switch means.

6. An apparatus for electronically reproducing different parts of a plurality of picture originals according to claim 5 further including tone correction means connected between said switch means and said reproducer.

* * * * *